INVENTORS
RICHARD R. EBY
& EDWIN B. NOLT

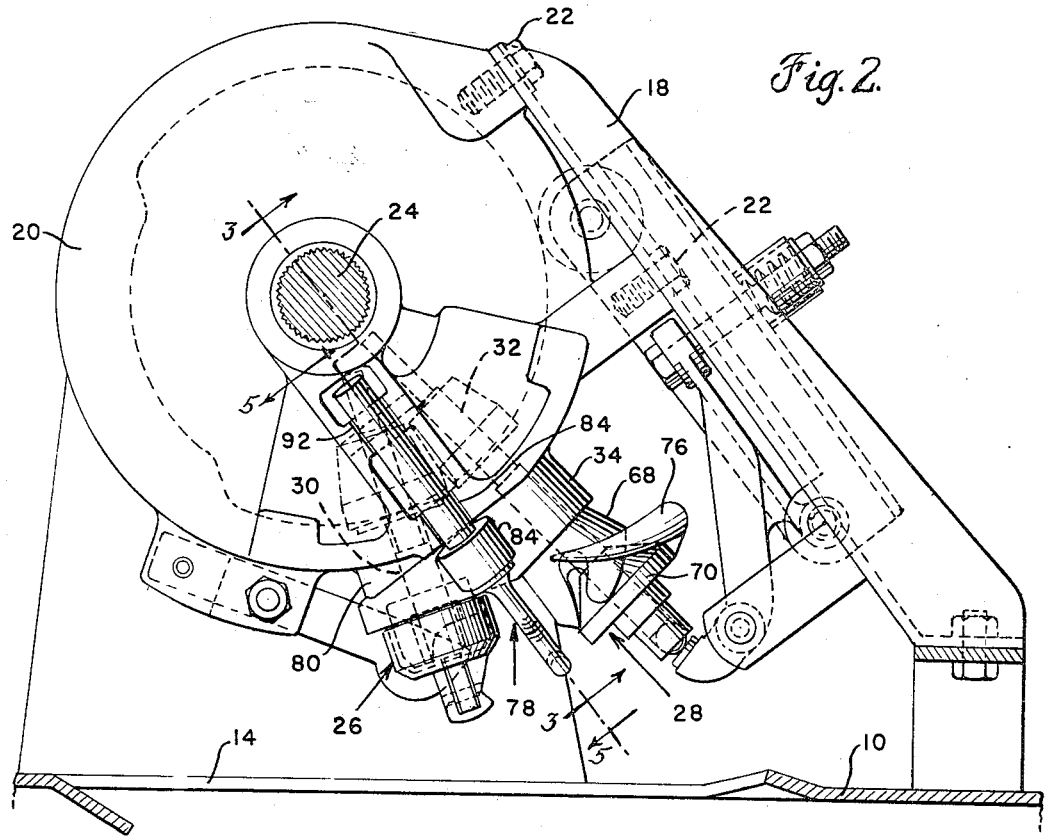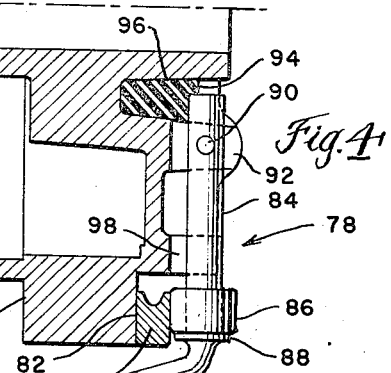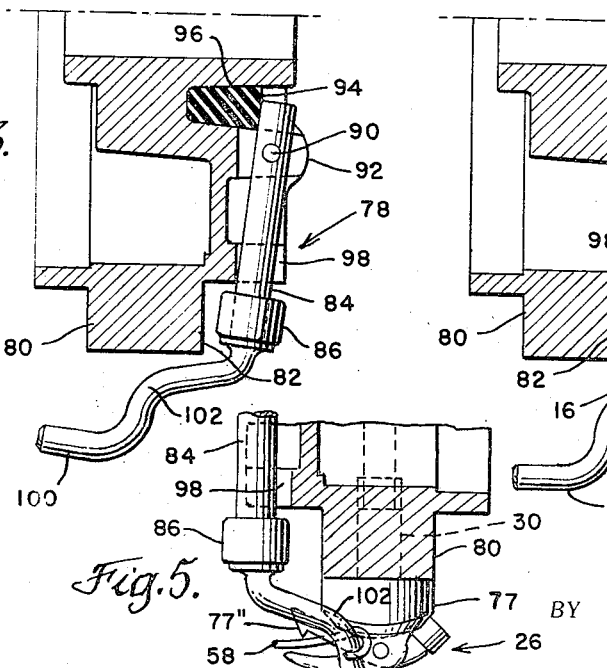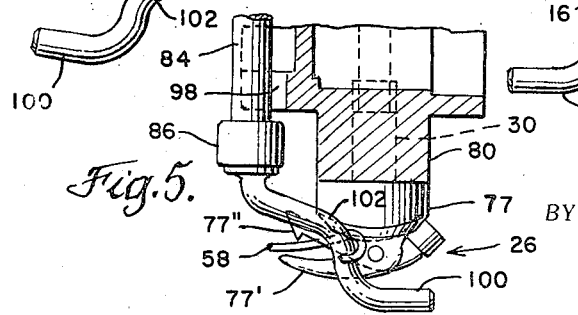

United States Patent Office

3,482,866
Patented Dec. 9, 1969

3,482,866
NEEDLE ACTUATED TWINE GUIDE FOR BALER KNOTTER
Richard R. Eby, Ephrata, and Edwin B. Nolt, New Holland, Pa., assignors to Sperry Rand Corporation, New Holland, Pa., a corporation of Delaware
Filed Aug. 15, 1968, Ser. No. 752,875
Int. Cl. B65h *69/04*
U.S. Cl. 289—15                                                  7 Claims

ABSTRACT OF THE DISCLOSURE

Twine knotter mechanism for a baler supported on the case of a baler and comprising a knotter unit and adjacent clamping unit arranged to hold the leading end of a strand of twine clamped while an arcuate twine needle moves around the trailing end of a bale being formed to carry an elongated loop of twine around said end of the bale so that one side of said loop may be tied by said knotter unit to said clamped end of said strand of twine, in combination with needle-actuated guide means for the twine to facilitate the effective positioning of the twine for reception deeply within the throat between the bill hook jaws of the knotter unit to render the operation of the various elements of the knotter and clamping units more efficient, said guide means being movable between two operative positions incident to the twine needle being projected to its full extent with a loop of twine and retracted therefrom, thereby actuating the guide means as aforesaid.

CROSS-REFERENCES TO RELATED APPLICATION

The present invention comprises an improvement applicable to the knotter mechanism comprising the subject matter of pending application, Ser. No. 661,016, Nolt et al., filed Aug. 16, 1967, now U.S. Patent 3,416,824, granted Dec. 17, 1968, and entitled Guide for Knotter Needle of Baler.

BACKGROUND OF THE INVENTION

Balers for bailing hay and other stem type agricultural crops are provided with a case into which and through which material is compressed and passes as it is formed into a bale. Such case is carried by the baler, particularly when the baler is of a portable nature. Accordingly, it can be seen that as the baler moves over a field, it is subjected to substantial jolting and jostling as determined by the terrain. The baler also carries a knotter unit and a clamping unit closely adjacent the same, usually on top of the case through which the bales move.

As bales are successively formed in said case, one end of each of a number of strands of twine, which are fed from compact balls thereof, are held in fixed position by the clamping units referred to and an arcuate twine needle provided for each strand of twine has an eyelet in the outer end thereof through which the strand passes in order that, when a predetermined amount of compressed material has been formed in the case, mechanism is actuated which carries the needles upwardly through the compacted material to determine the trailing end of a bale, thereby carrying an elongated loop of twine upwardly through the compacted material and around what becomes the trailing end of said bale for purposes of tightly encircling the bale with the twine strands. Associated knotter and clamping units then function automatically to tie one end of each elongated loop to the clamped leading ends of said strands.

The type of knotter units normally employed in knotter mechanisms for balers of the type to which the present invention pertains comprise, inter alia, a rotatable member which has a bill hook jaw rigidly fixed thereto for rotation therewith during the knot-tying function of the mechanism, and a cooperating bill hook jaw which is pivotally connected to said rotatable member in a manner to enable a portion of said pivoted bill hook jaw to cooperate with said other bill hook jaw fixed to said rotatable member for purposes of enclosing strands of twine between the same during a portion of the knot-tying cycle and especially during the rotation of said rotatable member about its axis.

Under normal conditions of operation of said knotter units, the entire knot-tying operation is performed so rapidly that the human eye can hardly follow the movement of the various elements which perform the same. Actually, such operation occurs within a period of between approximately one and two seconds of time. Accordingly, it is essential to the successful operation of the knotter units that the strands of twine to be received between said cooperating bill hook jaws must be disposed therebetween positively and preferably to a substantial depth so as to be certain that the strands will be enclosed thereby during certain manipulations of the strands incident to knotting the same together.

The purpose of the invention comprising the subject matter of said aforementioned co-pending application, Ser. No. 661,016, is to provide a suitable guide means arranged to engage the outer end of each arcuate twine needle during its movement in the vicinity of the knotter and clamping unit so as to dispose said outer ends of said needles and the loop of twine carried thereby reasonably within a satisfactory position for engagement of one side of said loop of twine by said units. In operation, however, it has been found that balers employing such guide means, while functioning with reasonable satisfaction, nevertheless disclosed the possibility and desirability for certain useful improvements to be made thereover which comprise the subject matter of the present invention.

SUMMARY OF THE INVENTION

The principal object of the present invention is to provide a twine knotter mechanism for a baler in which conventional, arcuate twine needles of a cantilever type are supported and arranged to be actuated to carry twine at the outer end of said needles into operative engagement with a clamped outer end of each strand of twine as held by clamping and knotter units of the knotter mechanism, and more particularly, to provide twine guide means positioned adjacent said knotter and clamping units and mounted for limited movement effected by engagement thereof by the outer end of the twine needle which cooperates with each of said units, said guide means being shaped and positioned to engage and positively move a pair of strands of twine into engagement with said knotter and between the bill hook jaws thereof so as to insure maximum efficiency of operation of said units, notwithstanding the high rate of speed at which the same operate.

It is another object of the invention to effect operation of such guide means by the outer end portion of each twine needle through the use of a somewhat wedging operation caused by the needle being forced between a relatively stationary member and a movable member which supports and actuates the guide member.

A further object of the invention is to provide antifriction means on said aforementioned movable member to increase the efficiency of operation thereof and also minimize wear upon the same during use.

Still another object of the invention is to form said aforementioned movable member as a lever and pivotally support the same intermediately of its ends, one end of said lever being engaged by yieldable means.

A still further object of the invention is to constitute said aforementioned yieldable means in the form of a rubber-like member.

One other object of the invention is to form the opposite end of said aforementioned movable lever member from that which engages said yieldable means in a suitable shape to constitute said twine guide.

One further object of the invention is to arrange said aforementioned yieldable means to cooperate with said movable lever member so that it functions upon withdrawal of the twine hook from engagement with said lever member to facilitate the operation of said knotter and clamping units upon the twine strands incident to tying a knot in a loop thereof.

Details of the invention and the foregoing objects, as well as other objects thereof, are set forth in the following specification and illustrated in the accompanying drawings, comprising a part thereof.

BRIEF DESCRIPTION OF THE DRAWINGS

FIG. 2 is a side elevation, on a larger scale than employed in FIG. 1, of the twine knotter and clamping units, and the actuating means therefor per se, and also showing the twine guide means which embodies the essential improvement comprising the present invention.

FIG. 3 is a fragmentary, radial sectional view, on a still larger scale than employed in FIG. 2, illustrating details of the movable member of the twine guide means disposed in one exemplary position thereof which is that when the same is not engaged by the twine needle, as seen on line 3—3 of FIG. 2.

FIG. 4 is a view similar to FIG. 3 but showing the movable member of the twine guide mechanism in the position it occupies when engaged by the twine needle.

FIG. 5 is a view taken approximately on line 5—5 of FIG. 3 and corresponding to the position of the twine guide shown in FIG. 4 to illustrate the positive movement of twine between the bill hook jaws of the knotter unit.

DESCRIPTION OF THE PREFERRED EMBODIMENTS

Figure 1:
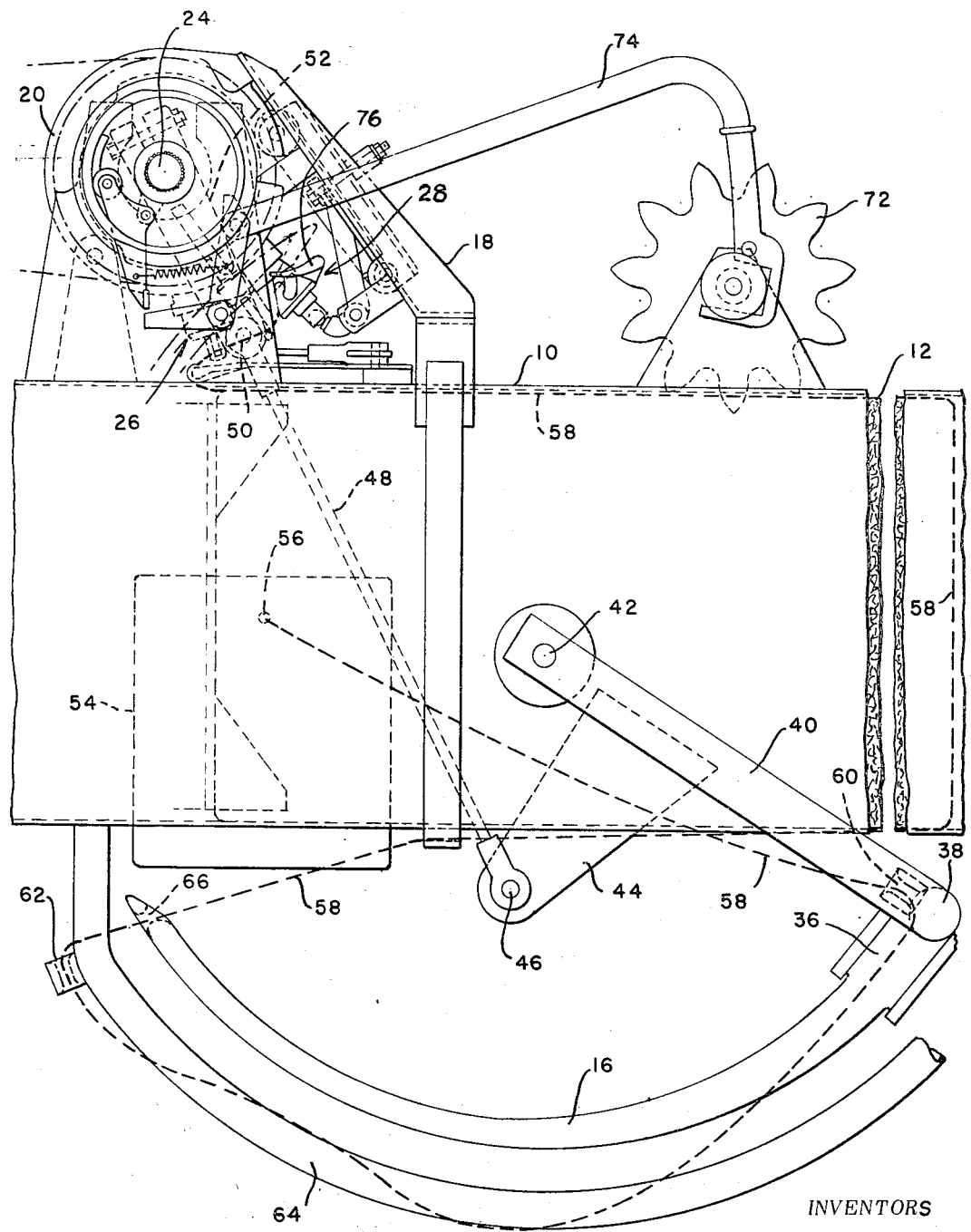
FIG. 1 is a fragmentary side elevation of the bale case portion of a baler upon which a knotter assembly is mounted in co-operative relation with an arcuate needle which is illustrated in its inoperative position in full lines, and, in phantom, the outer end of said needle is shown fragmentarily in a position in which it is nearly fully projected into cooperation with the knotter and clamping units of the knotter assembly.

In FIG. 1, a fragmentary portion of a baler case 10 is shown, part of the same being broken away to foreshorten the view as well as to expose a portion of bale 12 being formed in said case. The majority of balers presently employed are of the portable type and therefore it is to be assumed that the baler with which the present invention is concerned preferably is of such type. Referring to FIG. 2, in which a fragmentary portion of the upper wall of the case 10 is shown, it will be seen that said wall is provided with a slot 14 through which the outer end portion of a twine needle 16 projects incident to extending a strand of twine around the bale 12 at a predetermined location. In most baling operations, there are at least two strands of twine tied around each bale. Accordingly, each strand of twine is operated upon by an individual needle 16, as well as other mechanism described hereinafter.

Also mounted adjacent the upper surface of the case 10 is a rigid arm 18, the upper end of which is connected to a knotter frame casting 20 by suitable means such as bolts 22 shown in FIG. 2. A horizontal drive shaft 24 extends through the casting 20 for purposes of operating the knotter unit 26 and the clamping unit 28. Said units employ shafts 30 and 32 which extend radially from the axis of drive shaft 24 as clearly shown in FIG. 2. Said shafts are rotatably supported respectively within suitable bearing openings formed in a boss 34 provided on casting 20, for example.

In FIG. 1, it will also be seen that the twine needle 16 has a base end 36 which is suitably connected to a transversely extending support rod 38 from which a pair of arms 40 extend perpendicularly at the opposite ends thereof. The arms 40 respectively are disposed adjacent opposite sides of the case 10 and the outer ends of said arms are rotatably supported upon suitable pintles 42. An actuating ear 44 is fixed to one of the arms 40 and a pivot bolt 46 connects one end of a connecting link 48 thereto. The opposite end of connecting link 48 is pivotally connected to a crank pin 50 carried by the outer end of crank arm 52 which is fixed to drive shaft 24. Thus, drive shaft 24 moves the twine needles 16 from the inoperative full line position thereof shown in FIG. 1 to a projected, extended and operative position in which the outer end is disposed adjacent the knotter and clamping units 26 and 28, as shown in FIG. 1, in which operative position said projected outer end of the needle is illustrated in broken lines.

A suitable support for a supply of twine, such as a container 54, is mounted adjacent one side of the case 10, for example, for purposes of containing a ball or other compact arrangement of twine. The outer end of such source of twine extends through an opening 56. The strand 58 of said twine extends from opening 66 through a guide 60 supported on rod 38 adjacent the needle 16. From guide 60, the strand also extends through another guide 62 which is supported upon a rigid arcuate guard 64, shown in FIG. 1, and the opposite ends of which are fixed, for example, to the lower wall of case 10 by any suitable means. It will be understood that there is a similar guard 64 directly beneath each twine needle 16, in suitable spaced relationship thereto, so as to prevent the needle from contacting the terrain while the baler is passing thereover, for example.

The outer end of each twine needle 16 has an eye 66 therein through which the strand 58 of twine extends. From the eye 66, the strand 58 extends forwardly along the bottom of the bale 12 being formed, it being understood that appropriate slots or other openings are formed in the bottom of the case 10 to permit the strand 58 to engage the bottom of the bale when said strand is brought into complete encirclement therewith. Said strand, as shown in FIG. 1, adjacent the right-hand end thereof, also extends upwardly around the forward end of the bale 12 and along the top surface thereof, through a portion of the knotter unit 26, as shown somewhat diagrammatically in FIG. 1, and the leading end of said strand is clamped between clamping members 68 and 70 of the clamping unit 28 to secure it against movement as the formation of the bale progresses.

As the bale 12 is formed by the progressive feeding of compacted material into the rearward end of the case 10, the upper surface of the bale is engaged by a star wheel 72 which is mounted on the outer end of a supporting arm 74. The twine strand 58 feeds freely from the container 54 as the bale 12 is progressively formed. As controlled by the operation of star wheel 72, when a bale of desired size has been compressed by the plunger of the baler, not shown, which operates relative to case 10, and has been moved longitudinally through the case 10, control means comprising arm 74 and mechanism connested to the inner end thereof actuates clutching mechanism which is generally illustrated in FIG. 1 without specific indentity. Said clutching mechanism is of well known type in balers of this type and operates through a single revolution only.

The above-described operation of the clutch causes drive shaft 24 to make a complete revolution and then stop automatically. During said aforementioned revolution of the drive shaft 24, a number of related operations occur throughout the baler mechanism and especially by the knotter and clamping units 26 and 28 mounted on top of the case 10 thereof. Among these operations are the rotation of the knotter unit 26, the actuation of the clamping unit 28 to cause rotation of an arcuate twine hook 76 which is rigidly connected to the periphery of the lower portion of clamping member 70 of the clamping unit 28 and participates in the forming of a knot by the knotter unit 26, and the outer end of each needle 16 is moved upwardly through the slot 14 in the upper wall of case 10, and past the knotter and clamping units 26 and 28 as shown in FIG. 2. This movement of the needle is for purposes of forming and moving an elongated loop of the twine, the sides of which loop extend rearwardly from the eye 66 of each needle, into coaction with the knotter and clamping units 26 and 28.

Each knotter unit 26 comprises a head 77 which is fixedly secured to the outer end of rotatable shaft 30, as shown in FIG. 5. Projecting laterally from the outer end of head 77 is a bill hook jaw 77' which is integral with and therefore stationary relative to head 77. Extending through a bifurcated portion of stationary jaw 77' is a movable bill hook jaw 77". A suitable pivot pin shown in FIG. 5 extends transversely through both of said bill hook jaws in a manner to permit limited pivotal movement of jaw 77" relative to jaw 77' between the open position shown in FIG. 5 and a closed position, not shown. In said closed position, the hooked outer end of jaw 77", shown in FIG. 5, is moved counter-clockwise from such illustrated position to enclose an exemplary strand of twine 58 between the two jaws and retain the twine in such position during at least a portion of the rotation of shaft 30 incident to the operation of the knotter unit 26.

From the illustration in the accompanying drawings and the foregoing description, it will be seen that the plurality of needles 16 which are provided in a baler of this type move respectively within substantially vertical planes which are parallel to each other. Such movement carries a loop of twine 58 into the region of the bill hook jaws and disposes one side of said loop between said jaws, when in the open position shown in FIG. 5, for knotting of the same with the clamped end of the same strand engaged by clamping unit 28. In view of the very high rate of speed at which the knotter and clamping units operate, as described hereinabove, it is highly essential that means be provided which will positively insure the disposition of the strands of twine between the bill hook jaws, as aforesaid. Exemplary means to accomplish this objective comprise an outstanding feature of the invention, details of which are as follows.

The improved twine guide means 78 primarily comprises a stationary base member 80 which, if desired, may comprise a portion of boss 38. The base member 80 has a smoothly machined surface 82 which is slidably engaged by one side wall of the outer end portion of a needle 16 when the same is projected from idle position, as shown in FIG. 4. A twine guide member, in its preferred embodiment, comprises a rod-like actuating member 84 which is pivotally mounted at its upper end for limited movement of the intermediate portion and opposite outer end thereof with respect to the fixed guide surface 82 of the base member 80. To minimize wear upon the twine guide member 84, anti-friction roller 86, of suitably hardened nature, is rotatably mounted upon the member 84 and is longitudinally positioned thereon by a suitable supporting flange 88. The periphery of said roller comprises another guide surface for the needle 16 and cooperates with guide surface 82.

The actuating member 84 is pivotally supported at its upper end by means of a pivot pin 90 which extends between a pair of spaced ears 92 which define part of a vertically-extending recess disposed along one vertical wall of the member 80 for the reception of the upper portion of member 84. From FIGS. 3 and 4, it will be seen that the pivot pin extends through member 84 a short distance inwardly from the upper end thereof for purposes to be described.

Yieldable means, specifically illustrated as being in the nature of a rubber block 94, are illustratively shown in FIGS. 3 and 4 as being mounted within an appropriate recess 96, formed in member 80, so as to engage the upper end of member 84 above pivot pin 90. The size and resilient nature of the yieldable means 94 are such that said upper end of member 84 normally is urged to the inoperative position thereof shown in FIG. 3. When the member 84 is disposed in such position, the distance between the stationary surface 82 and the periphery of antifriction roller 86 on the member 84 is less than the transverse thickness of the twine needle 16.

When the outer end portion of the twine needle 16 is projected between the stationary surface 82 and the antifriction roller 86 of actuating member 84, the latter is moved counter-clockwise, to the exemplary position thereof shown in FIG. 4, in opposition to the compressive force normally exerted by yieldable means 94 upon the upper end of member 84. Such movement of member 84 further is guided by the portion thereof immediately above roller 86 being slidable within a short slot 98 which is of similar width and vertically aligned with the space between ears 92.

The provision of the anti-friction roller 86 on the movable guide member 84 minimizes wear incident to the outer end of needle 16 engaging said movable actuating member 84 to move it to the position shown in FIG. 4. Even when said actuating member 84 is extended counterclockwise to its fullest operative position, slot 98 is sufficiently deep that the walls thereof serve to resist any tendency of the projecting movement of needle 16 to move member 84 to any noticeable extent laterally from its plane of movement.

In accordance with the principles of the present invention, the normally lowermost end portion 100 of movable actuating member 84 is a twine guide member and is shaped, as shown in FIGS. 3 and 4, to include an intermediate offset portion 102 which is smoothly curved to project toward the lower end of the stationary member 80. Particularly the portion 102 of guide member 100, when moved especially to the position shown in FIGS. 4 and 5, will engage the twine strands, including strand 58, which are then aligned with the opening between bill hook jaws 77' and 77".

Said guide member will move such strands positively and deeply into the throat of such opening so as to insure retention of the strands by the bill hook unit when the hooked outer end of jaw 77" is moved toward jaw 77' incident to movement of the twine hook 76 with respect to the knotter unit 26, as it moves relative thereto to tie a knot in said one side of said loop of twine 58 projected by needle 16 held between clamping members 68 and 70 of clamping unit 28.

During the latter portion of the knotting operation of the knotter unit 26, as supplemented by operation of the clamping unit 28, particularly after the twine hook 76 has been revolved to engage said elongated loop of twine delivered by the outer end of needle 16, said needle is retracted from wedging engagement between the stationary surface 80 and roller 86. When this occurs, the rubber block resilient means 94 will restore the movable acuating member 84 for guide member 100 to the inoperative positions thereof shown in FIG. 3.

Having thus described our invention, what we claim is:

1. Twine knotter mechanism for a baler comprising means to support a knotter unit and clamping unit in close operative positions, said clamping unit being arranged to clamp the leading end of a strand of twine to be tied around a bale, an arcuate needle supported for swinging movement of the outer end thereof from a retracted to an extended operative position adjacent said knotter and clamping units and having an eye in said outer end thereof through which twine passes from a supply thereof to form an elongated loop of twine and carry one side of said loop into engagement with said knotter unit for formation of a knot to tie the strand of twine comprising one side of said loop to said clamped end of said strand, said knotter unit having a plurality of relatively movable bill hook jaws to receive twine strands therebetween, and means to actuate said knotter and clamping units in timed sequence with the movement of the outer end of said needle to said extended position thereof while said bill hook jaws are moved between open and closed positions to clamp twine strands therebetween while the knot is being tied, in combination with twine guide mechanism, and means supporting said guide mechanism adjacent said knotter and clamping units, said guide mechanism comprising a guide member having portions engageable with said strands of twine when said bill hook jaws are open, and actuating means for said guide mechanism operable to engage and positively guidably move said strands relatively deeply into the opening between said open bill hook jaws to insure clamping of said strands therebetween when said jaws are moved to closed position.

2. The twine knotter mechanism according to claim 1 in which said guide member comprises a pivoted lever movable between inoperative and guiding positions, and said lever being positioned for interengagement by said needle when projected to extended operating position thereof to effect movement of said lever to said guiding position.

3. The twine knotter mechanism according to claim 2 in which said lever is pivotally supported adjacent one end and said needle interengages the same intermediately of the ends thereof, and the free end portion of said lever comprising guiding means engageable with said twine.

4. The twine knotter mechanism according to claim 3 further including an anti-friction roller on said lever positioned to be engaged by said needle to actuate said lever when said needle is moved to said projected position thereof.

5. The twine knotter mechanism according to claim 3 in which said free end of said lever extends angularly to the pivoted end portion thereof and said free end of said lever having a smoothly curved offset portion directed toward the bill hook of said knotter unit to effect said guiding of said twine.

6. The twine knotter mechanism according to claim 3 further including resilient means positioned for engagement by the terminal end of the pivoted end portion of said pivoted lever and operable to be yieldably engaged thereby when said lever is moved to guiding position by said needle and upon disengagement of said lever by said needle said yieldable means being operable to move the free end of said lever and guiding means to the inoperative position thereof.

7. The twine knotter mechanism according to claim 3 further including slotted means receiving an intermediate portion of said lever and operable to permit pivoted movement thereof within a plane transverse to the axis of the pivot of said lever and restrain movement of said lever out of said plane when engaged by said needle.

References Cited

UNITED STATES PATENTS

| 2,703,246 | 3/1955 | Bronzin | 289—15 |
| 3,248,139 | 4/1966 | Bledsoe | 289—15 |

LOUIS K. RIMRODT, Primary Examiner